Nov. 5, 1968  J. R. GUINGAND  3,408,863
DEVICES FOR MEASURING FORCES IN A MOVING STRIP
Filed Aug. 10, 1965  2 Sheets-Sheet 1
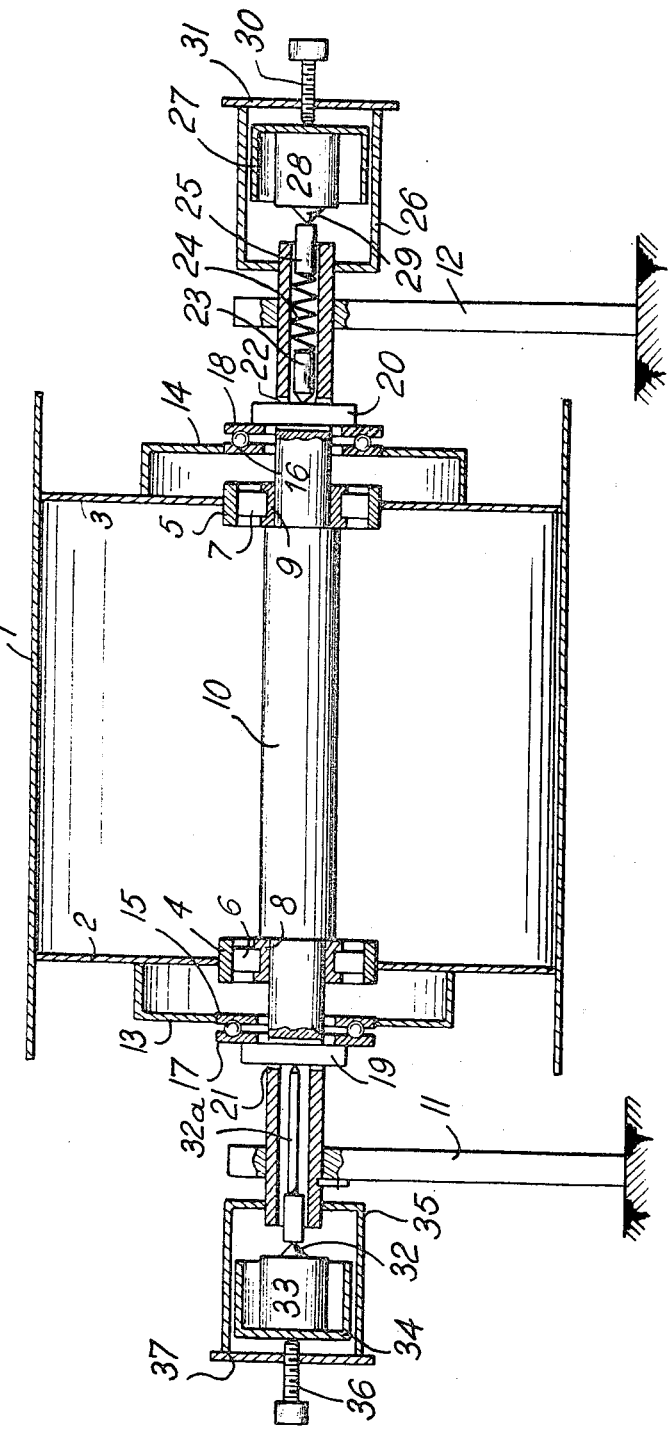

Nov. 5, 1968 J. R. GUINGAND 3,408,863
DEVICES FOR MEASURING FORCES IN A MOVING STRIP
Filed Aug. 10, 1965 2 Sheets-Sheet 2
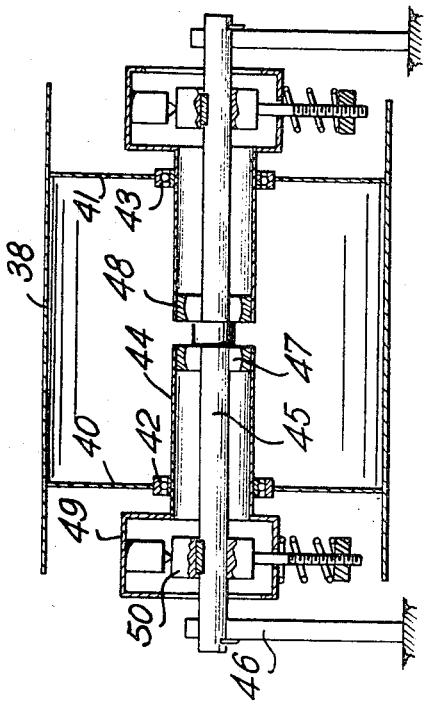
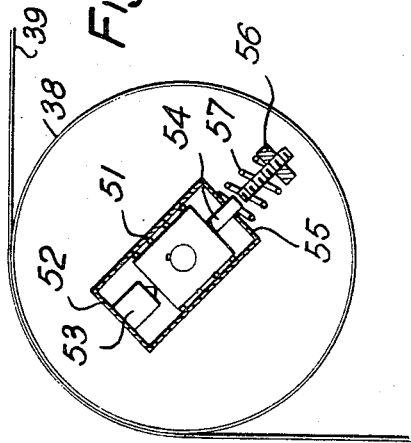
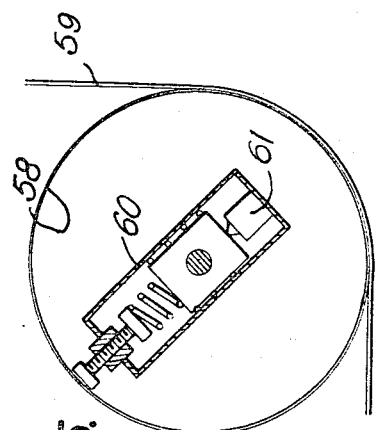
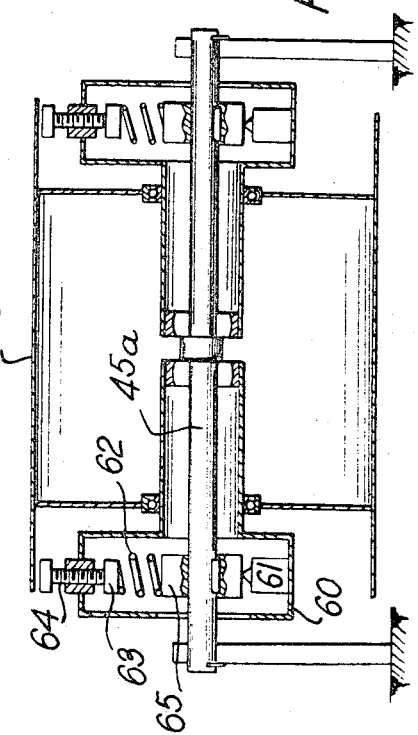

United States Patent Office 3,408,863
Patented Nov. 5, 1968

3,408,863
DEVICES FOR MEASURING FORCES IN A MOVING STRIP
Jean Raymond Guingand, Paris, France, assignor to Societe Anonyme Heurtey, Paris, France
Filed Aug. 10, 1965, Ser. No. 478,678
Claims priority, application France, Aug. 17, 1964, 985,343
5 Claims. (Cl. 73—144)

ABSTRACT OF THE DISCLOSURE

A device for measuring the tension in a moving strip by passing the strip around a roll which is rotatably mounted on a pair of hollow shafts which in turn are mounted, via ball and socket joints, at the center of an internal stationary shaft. An adjustable force measuring cell is mounted in a guide which is secured between the stationary shaft and each hollow shaft in a plane which bisects the angle of wrap of the strip on the roll such that the cell produces a measurement of force related to the tension in the strip in response to relative displacement of the hollow shafts with respect to the stationary shaft.

---

It is necessary in various arts, and particularly in the art of processing continuous sheet-metal strip, to measure not only the movement of the strip but also the forces exerted in such moving strips. The main forces involved are the tension exerted on the strip and the lateral force tending to deviate it from its line of travel.

The present invention relates to an apparatus for permitting such measurements in a simple way.

The invention accordingly provides, for the measurement of forces, dynamometric cells positioned adjacent the ends of a shaft supporting a roll over which a strip runs, compensating means being provided for calibrating said cells.

The invention further provides, for the purposes of measuring the tension in such a strip, a roll about which the strip is partly wrapped, which is mounted slidably in the plane bisecting the angle of wrap and which is associated with dynamometric cells for measuring the forces developed in said bisecting plane.

For the purpose of measuring lateral forces, compensating means are provided for centering the roll upon the axis of a line, together with elastic compressing means for automatically taking up any play which may develop in the system of anti-friction bearings associated with the roll.

In both cases the dynamometric cells may be coupled to direct read-out dials, or to recording or counting read-out devices, or else to a servo-system for activating control means of the tension and/or the direction of travel of the strip whereby to prevent, in particular, a given maximum tension from being exceeded.

In one specific form of embodiment, the force measuring device comprises a roll supporting a strip and mounted through the medium of anti-friction bearings and thrust bearings if need be, on a fixed shaft.

Where it is required to measure the tension in a strip, a roll having a strip wrapped partially around it is mounted through the medium of lateral anti-friction bearings on two hollow shafts surrounding said fixed shaft, which shafts are supported adjacent the center-plane of the roll rim by means of ball-and-socket joints on said inner fixed shaft, the dynamometric cells being interposed, externally of said roll, between the corresponding ends of the hollow shafts and the facing portion of the fixed shaft.

Prismatic housings rigid with the ends of the hollow shafts contain said cells and form a guideway parallel with said bisecting plane, in cooperation with matching blocks rigidly connected to the fixed shaft.

Adjustable elastic means are interposed, opposite the cells, between the fixed shaft and the hollow shaft in order to compensate for the effect of gravity on the weight of the roll and its ancillaries—notably the hollow shafts.

Where it is desired to measure lateral forces, a roll of this type is mounted on such a fixed shaft through the medium of anti-friction bearings and thrust bearings, said fixed shaft having hollow ends formed with traverse openings therein which receive bars and thrust pins for transmitting the lateral forces to dynamometric cells adjustably mounted in end housings of said fixed shaft.

The description which follows with reference to the accompanying non-limitative exemplary drawings will give a clear understanding of how the invention can be carried into practice.

In the drawings:

FIG. 1 shows in schematic section a device for measuring the lateral force in an advancing strip;

FIG. 2 shown on a reduced scale and in schematic section a device for measuring the tension in a strip;

FIG. 3 is a section on the line III—III of FIG. 2;

FIG. 4 is an alternative embodiment of the device of FIG. 2; and

FIG. 5 is a section on the line V—V of FIG. 4.

The device shown in FIG. 1 comprises a roll having a cylindrical rim 1 assembled on lateral flanges 2 and 3 which bear against the outer races 4 and 5 respectively of roller bearings 6 and 7 of which the inner races 8, 9 are supported on corresponding bearing surfaces against steps formed on a fixed shaft 10. The outer races 4 and 5 of these antifriction bearings are slidable in both directions, in parallelism with the axis of the roll, on the rollers 6 and 7. The ends of the shaft are retained in and keyed to lateral supports 11 and 13.

The flanges 2 and 3 are rigidly connected to bells 13 and 14 the perforated bottoms of which support the inner races 15, 16 of thrust ball-bearings of which the outer races 17 and 18 are applied against external transverse bars 19 and 20. Said bars extend with clearance through transverse openings 21 and 22 formed in the ends of the shaft 10. These shaft ends are hollow and the voids therein open out into said openings.

On one side, for instance on that of the bar 20, the hollow end receives against said bar an internal pointed pin 23 against which presses a spring 24 the other end of which bears against a further pin 25 protruding into a housing 26 rigid with the corresponding end of the shaft 10. The housing 26 has mounted slidably therein a cup 27 containing a dynamometric cell 28 the pointed moving element 29 of which presses against the outer protruding end of pin 25, in response to an adjustment screw 30 mounted in the bottom 31 of housing 26, provided with an outer knob or adjustment head and thrusting against the rear of cup 27.

On the other side, the bar 19 bears against a rigid pin 32a which is in turn applied against the pointed end 32 of the moving element of a dynamometric cell 33 mounted in similar fashion in a cup 34 which is slidable in a housing 35 connected to the corresponding end of shaft 10, said cup bearing against a similar adjustment screw 36 screwed into the bottom 37 of housing 35.

The lateral forces exerted on the strip rolling over the roll 1 are transmitted to the rim thereof by adhesion. The displacements are transmitted by the thrust ball-bearings and retransmitted directly to the dynamometric cells 28 and 33. The spring 24 neutralizes any backlash in these thrust bearings. The screws 30 and 36 serve both to calibrate the cells in conjunction with the spring 24 (the degree of compression of which is thereby adjusted), and to center the roll on the axis of the path of travel of the strip.

Provision may be made for a dial giving a direct reading by means of the dynamometric cells, or else the latter may be connected directly or indirectly to recording and/or counting devices, or even to a servomechanism for correcting the travel of the strip where necessary.

With regard to the tension measurements, as may be seen on FIGS. 2 and 3, a rimmed roll 38 is positioned at a point of change of direction in the path of a strip 39 whereby the latter is caused to wrap itself around the rim 38 over a given sector. The roll is mounted through the medium of flanges 40, 41 on anti-friction bearings 42 and 43. The bearing 42 is supported on a hollow shaft 44 through which extends with clearance a fixed shaft 45 the ends of which are retained in and keyed to external supports 46.

Adjacent the middle of shaft 45 is positioned a block 47 having a spherically contoured periphery which slidably receives thereon a liner 48 of matching contour rigidly connected to the inner end of hollow shaft 44.

Externally of flange 40 hollow shaft 44 receives a housing 49 of rectangular internal shape which is guided over a matching prismatic block 50 rigid with shaft 45, the plane of symmetry of the whole lying in the plane bisecting the angle of wrap of the strip about the roll. Ball type anti-friction guide means 51 may be interposed if required betwene housing 49 and block 50. The latter is keyed to shaft 45 in order to ensure its fixed position.

Between one end closure 52 of housing 49 and the facing side of block 50 is interposed a dynamometric cell 53. The block 50 is rigidly connected to a draw-link 54 at its end remote from cell 53, and this draw-link extends through the end closure 55 remote from end closure 52 and receives a nut 56 which engages with a threaded portion on the draw-link. A spring 57 is interposed between nut 56 and end closure 55.

The roll 38 is mounted symmetrically and the opposite side is equipped with identically disposed components.

In this particular arrangement the strip 39 passes over the top of the roll 38.

If, as shown in FIGS. 4 and 5, a strip 59 passes over the undersurface of the rim 58 of a similar roll, then the general arrangement will be modified only insofar as the mutual positioning of the dynamometric cells and the spring is concerned. For in the corresponding housing 60 the dynamometric cell 61 is still located on the side nearer the arc of wrap of the strip, but a spring 62 in the housing 60 is interposed between a bearing plate 63 terminating a screw 64 and the corresponding block 65 rigid with the fixed shaft 45a, said screw being screwed into the bottom of housing 60.

In both cases the spring 57 (or 62) is used to counter the effect, on the measurement, of gravity exerted on the mass of the roll and its ancillaries. In the case of FIGS. 2 and 3 this spring externally disposed balances said mass in compression, as in that of FIGS. 4 and 5 the internal spring 62 relieves the cell of the weight of the roll and its ancillaries.

A mathematical expression for the leverage exerted relates the value of the tension in the strip to the force applied to a dynamometric cell. These leverages are, on the one hand, the distance between the plane of flange 40 and the center of the ball-and-socket joint 47 and, on the other, the distance between said center and the plane containing the point of application of the moving element of the dynamometric cell on the corresponding block.

Further, a trigonometric relationsnhip exists between the tension in the strip, the force exerted on a cell and the angle of wrap of the strip about the roll.

Provision may be made for a single measuring instrument with a read-out dial for the two dynamometric cells of the same measurement roll, irrespective of the disposition thereof with respect to the strip. As stated precedingly, such an instrument equipped with a direct read-out dial may be replaced with or associated to recording or computing devices, or possibly even to a servomechanism operating on elements adapted to adjust the tension in the strip.

It goes without saying that many changes and substitutions of parts may be made to the specific forms of embodiment hereinbefore described without departing from the scope of the invention, as defined by the hereunder appended claims.

What I claim is:

1. In a device for measuring tension forces exerted on a moving strip, in combination, a stationary shaft having opposite ends, a roll upon which said strip is applied according to a given angle of wrapping, a pair of hollow shafts interposed between said roll and said stationary shaft, a pair of lateral flanges secured to said roll, bearings rotatably supporting each of said flanges on a corresponding hollow shaft, ball and socket joints between internal extremities of each said hollow shaft and a central portion of said stationary shaft, guiding means secured between said stationary shaft and each of said hollow shafts in the vicinity of the ends of said stationary shaft, said guiding means being disposed parallel to the bisecting plane of said wrapping angle, force measuring means mounted in said guiding means between said stationary shaft and each said hollow shaft for producing a measurement of force related to the tension in the strip, in response to relative displacement of the hollow shafts with respect to the stationary shaft, and means engageable with said force measuring means for the calibration thereof.

2. In a device for measuring forces exerted on a moving strip according to claim 1, wherein said guiding means each comprises one block keyed on said stationary shaft, presenting guiding faces parallel to said bisecting plane, one housing surrounding said corresponding block and presenting guiding surfaces operatively cooperating with said guiding faces of said block, each said force measuring means being a dynamometric cell being interposed between an end face of said block and a corresponding bottom of said housing.

3. In a device for measuring forces exerted on a moving strip according to claim 2, anti-friction devices interposed between said guiding faces of said block and guiding surfaces of said housing.

4. In a device for measuring forces exerted on a moving strip according to claim 1, wherein the means for the calibration of each cell comprises elastic means interposed externally between a bottom of said housing and an adjustable abutment member fitted at the end of a draw-link integral with a corresponding block and projecting through said bottom.

5. In a device for measuring forces exerted on a moving strip according to claim 1, wherein the means for the calibration of each cell comprises elastic means interposed internally between an end face of said block and an adjustable abutment member carried by a corresponding bottom of said housing.

References Cited

UNITED STATES PATENTS

| 1,168,925 | 1/1916 | Zanzig | 73—144 |
| 2,582,886 | 1/1952 | Ruge | 73—141 |
| 2,974,894 | 3/1961 | Aaron | 242—75.43 |
| 3,260,106 | 7/1966 | Hull et al. | 73—144 |

FOREIGN PATENTS

| 576,760 | 5/1924 | France. |
| 964,137 | 7/1964 | Great Britain. |

RICHARD C. QUEISSER, *Primary Examiner.*

J. H. WILLIAMSON, *Assistant Examiner.*